United States Patent [19]

Gaston

[11] Patent Number: 4,594,050

[45] Date of Patent: Jun. 10, 1986

[54] APPARATUS AND METHOD FOR DETECTING SURGE IN A TURBO COMPRESSOR

[75] Inventor: John R. Gaston, Allegany, N.Y.

[73] Assignee: Dresser Industries, Inc., Dallas, Tex.

[21] Appl. No.: 609,703

[22] Filed: May 14, 1984

[51] Int. Cl.[4] .............................................. F01D 17/02
[52] U.S. Cl. ............................................ 415/1; 415/47
[58] Field of Search .................. 415/1, 11, 27, 28, 47, 415/118; 60/39.27, 39.29

[56] References Cited

U.S. PATENT DOCUMENTS

| | | | |
|---|---|---|---|
| 2,955,745 | 10/1960 | Hunter | 415/47 |
| 4,046,490 | 12/1977 | Rutshtein | 417/28 |
| 4,060,929 | 12/1977 | Elsaesser et al. | 415/27 |
| 4,265,589 | 5/1981 | Watson et al. | 415/47 |
| 4,399,548 | 8/1983 | Castleberry | 377/16 |

OTHER PUBLICATIONS

Dresser Industries, Inc. "Surge Detection System" Dwgs. 466-745-601 and 466-745, (1979).
Dresser Industries, Inc. "Description of Operation-Surge Detection System", Dwgs. 468-249-601; 468-249, (1981).
Dresser Industries, Inc. "Surge Detector, Axial Flow Compressor" Dwgs. 470-464-601; 470-464, (1983).
GHH "Description of GHH Surge Limiter" (1974).

Primary Examiner—Louis J. Casaregola

[57] ABSTRACT

A surge detector for a rotating compressor having a compressor stage with a gas inlet and a gas outlet and experiencing rapid changes in inlet temperature as said surges occur, said detector comprising means mounted in said compressor inlet for generating signals representing only those temperature changes therein which are due to surge conditions, and means coupled to said generating means for receiving said signals representing said temperature changes and producing control signals based upon said temperature changes in said inlet whereby the number, duration and magnitude of said surges may be detected.

13 Claims, 3 Drawing Figures

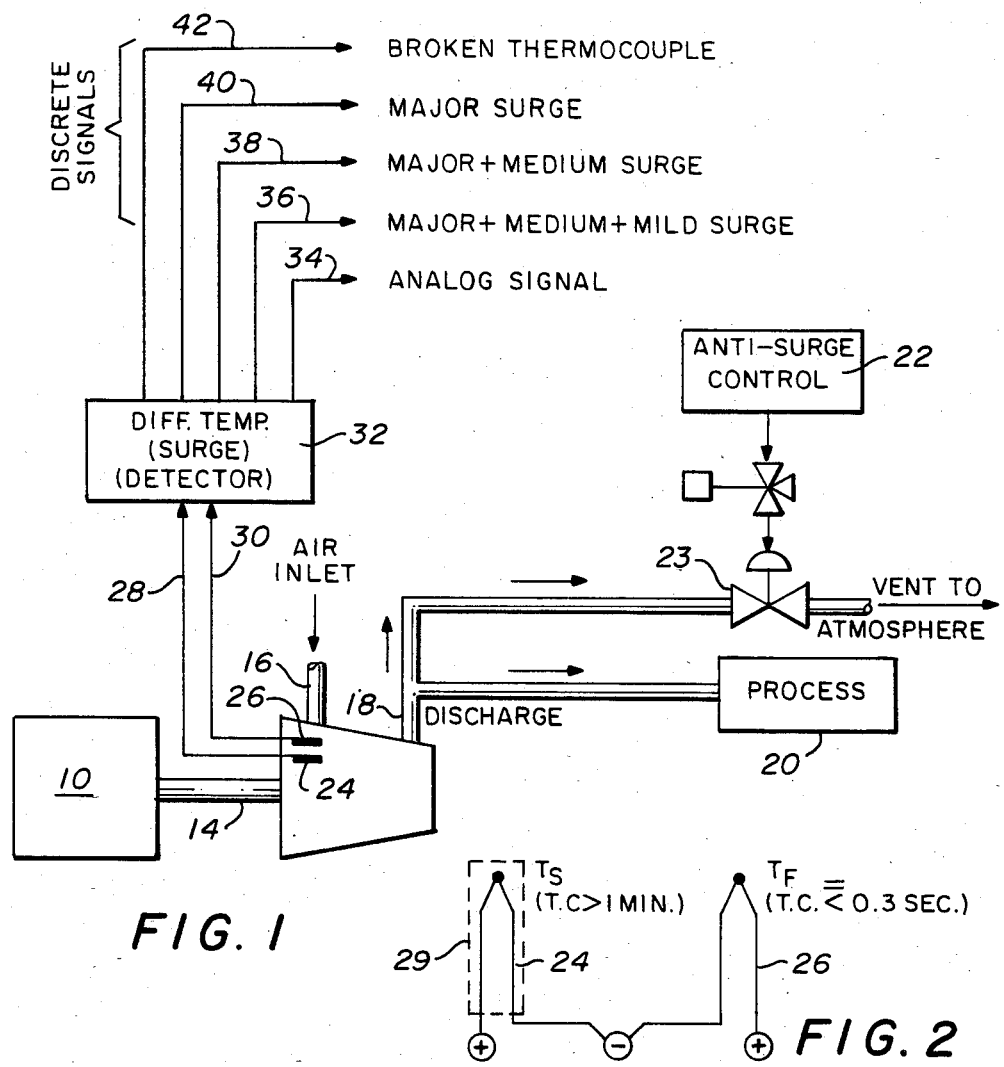
FIG. 1
FIG. 2
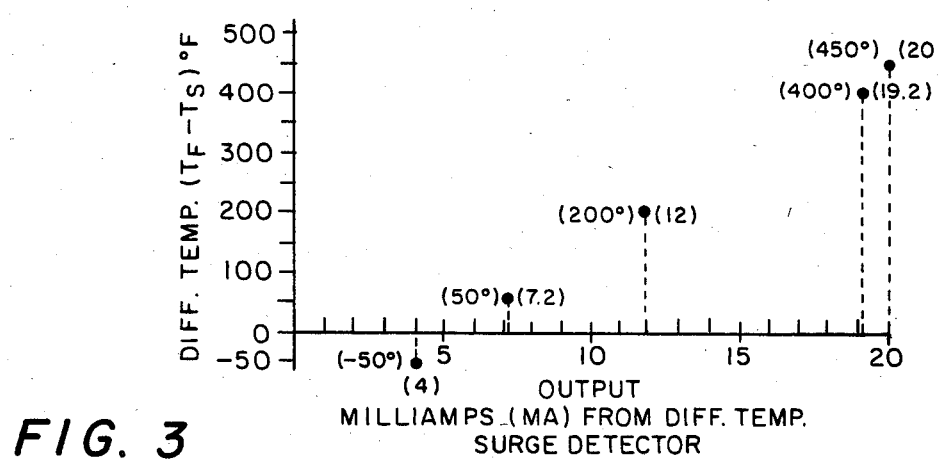
FIG. 3

APPARATUS AND METHOD FOR DETECTING SURGE IN A TURBO COMPRESSOR

BACKGROUND OF THE INVENTION

The present invention relates generally to detecting surges that occur in rotating compressors and, more particularly, for a method and means to quickly detect surge and generate control signals which can be used to prevent serious compressor damage caused by excessive surging by providing warnings and control actions before the cumulative stresses of repetative surge cycles damage the compressor.

Turbo compressors are used to deliver compressed gas into many and varying type processes. These processes impose a resistance to flow. The resistance may be relatively constant, or it may vary considerably during normal or abnormal process operation. An increase in process resistance causes an increase in the compressor discharge pressure. If the resistance becomes excessive, a point is reached where the compressor is not capable of producing the necessary discharge pressure and a momentary flow reversal occurs. This flow reversal is called "surge". It can cause serious compressor damage due to induced vibratory stresses and very high temperatures. During normal operation the discharge gas is hot due to the compression process. When surge occurs the hot gas flows back through the compressor causing the inlet temperature to increase. Work is actually done on the gas during the "surge" flow reversal, so the resultant inlet temperature can increase to a value even higher than the discharge temperature had been just before the flow reversal. This is particularly true of an axial flow type turbo compressor, which also is more susceptible to surge damage. Therefore, the invention is of particular value for axial flow compressors. This phenomenon may be repeated at frequent internals and a high mechanical stress is placed upon the blades and bearings which can cause serious compressor damage. The potentially damaging effect cannot be precisely measured, but is a function of the number, magnitude and duration of the surge cycles.

The main protection against surging is the use of an antisurge control mechanism which, at some limiting point prior to surge, opens bypass valves to vent the compressor discharge to the atmosphere to keep the rate of fluid flow in the compressor at some admissable value. A surge detection system, as in this invention, is used as a backup in case the main protection system fails to prevent surges. Various methods of surge detection were used in the prior art.

In some instances a single temperature sensor such as a thermocouple is located at the compressor intake to detect the sudden temperature rise which accompanies the surge. In such case, the system must be set to operate higher than the highest normal operating temperature in order to detect the abnormal temperature rise. For example, a 150° F. set point would be typical for a maximum normal operating temperature of 100° F. Further, with the single temperature sensor the time to detect surge increases as the operating temperature decreases. For example, an increase of 150° F. would be needed to activate the surge detector when the compressor is operating at 0° F. Such a system would have failed to count medium and mild surges because the change in temperature was less than 150° F.

Other prior art systems use a pressure differential or rate of change in pressure or flow to detect surge. See U.S. Pat. No. 4,046,490. These systems using pressure change as the detector must be set to operate over a rate of change indicative of surge while ignoring normal rates of change. The proper setting cannot be accurately calculated, therefore actual compressor surge tests are necessary to assure correct setting.

As stated earlier, some prior art systems had only one thermocouple in the compressor. Others have one in the compressor and another located to sense gas temperature in the inlet pipe upstream from the compressor. Automatic controls were required to disable the surge detection system when the compressor was shut down. This was necessary to prevent false surge alarms when a compressor thermocouple is heated due to temperature soaking from the hot discharge into the compressor. Still other surge detectors use the vibration of the compressor to detect the occurrence of a surge as disclosed in U.S. Pat. No. 4,399,548. Here the surge must progress to a certain degree of intensity before the vibration is serious enough to be detected.

The present invention provides faster and more reliable surge detection and responds to all surges which cause greater than a 50° F. increase in temperature regardless of the operating temperature at which the surge occurs. Also, the system response is extremely fast and reacts to start corrective action less than ¼ of a second after the onset of a surge. Further, set points for this invention are not rate-of-change dependent and thus surge tests are not necessary. Also, no automatic controls are required to disable the surge detection system when the compressor is shut down because the heat soaking is not fast enough to produce a change in temperature alarm required by the present case. Further, it provides a warning signal or compressor shutdown based upon the number, intensity and duration of the surges, not just the number of them.

The present invention utilizes two thermocouples located in the compressor inlet such that both thermocouples are subject to the common gas inlet temperature. One of the thermocouples has a rapid response, Tf, to temperature change and the other thermocouple has a slow response, Ts, to temperature change in comparison with the first thermocouple rapid response. These thermocouples are connected electrically in opposed relationship thereby producing a signal output for a given change in temperature. Thus with any rapid temperature change accompanying a surge, a differential signal is produced in proportion to the temperature change whereby the differential signal may be used to detect the number, magnitude and duration of the surges which are occurring. Thus the present invention provides the following unique features:

1. Provides "fail safe" action in the event of a disconnected or broken wire in the control circuit.
2. Provides an alarm signal if the thermocouple detection circuit breaks.
3. Provides signal representing mild surges.
4. Provides signal representing medium surges.
5. Provides signal representing major surges.
6. Provides an analog signal for every surge cycle. This signal can be indicated or recorded to provide a permanent record of all surges and their relative intensity. The signal peak valve increases with surge intensity.
7. Provides a signal to open a discharge vent valve to eliminate the surge condition.

8. Provides a signal to stop the compressor when surge occurs.

9. Provides full time surge detection, i.e. the system is operable throughout startup, and the critical shutdown phase of operation, whereas it was necessary to disable systems utilizing prior art to avoid false surge alarm/counts during startup and shutdown.

SUMMARY OF THE INVENTION

The present invention relates to a surge detector for a rotating turbo compressor such as, for example, an axial flow compressor, having a compressor stage with a gas inlet and a gas outlet and experiencing rapid changes in inlet temperature as said surges occur, said detector comprising means mounted in said compressor inlet for generating signals representing only those temperature changes therein which are due to surge conditions and means coupled to said generating means for producing control signals based upon said temperature changes in said inlet whereby the number, duration and magnitude of said surges may be detected.

The novel invention also relates to a method of detecting surges in a turbo compressor which has a gas inlet and a gas outlet and which experiences a rapid temperature change in said inlet gas temperature during a surge, said method comprising the steps of detecting only those temperature changes in said compressor inlet which are due to surge conditions, and generating control signals based upon said temperature changes whereby the number, duration and magnitude of said surges are detected thereby enabling proper maintenance of the turbo compressor.

BRIEF DESCRIPTION OF THE DRAWINGS

These and other more detailed objects and advantages of the present invention will be seen in relation to the accompanying drawings in which:

FIG. 1 is a diagrammatic representation of the present invention;

FIG. 2 shows the connection of the two thermocouples which provide a differential temperature detector which produces output signals representing a rapid change in temperature, a broken thermocouple circuit and the magnitude and duration of a surge; and FIG. 3 is a graph illustrating the output current of the surge detector based upon the temperature differential detected by a thermocouple having a fast time constant and a thermocouple having a slow time constant.

DETAILED DESCRIPTION OF THE DRAWINGS

FIG. 1 is a diagrammatic representation of a rotary turbo compressor such as, for example only, an axial flow compressor which utilizes the novel surge detector forming the present invention. As can be seen in FIG. 1, a drive source 10, which could be any type of electrical or fuel driven motor, provides power to and rotates compressor 12 through a coupling means 14 such as a drive shaft. Compressor 12 has a gas inlet 16 and a discharge port or gas outlet 18 which is coupled to some device 20 for operating a process of any sort which could use the output of compressor 12.

It is well known in the compressor art that compressors are designed to operate under certain well defined stable flow conditions. When the flow becomes unstable due to a flow interruption in the system, compressors will surge. Compressor surge may be defined as a large amplitude, low frequency oscillation of the total annulus-averaged flow through the compressor. It is also well known in the art that each time a compressor surges the compressor blades and bearings are subjected to very high stresses. Excessive surging may eventually weaken the compressor blades to a point that de-blading is possible. Thus, serious compressor damage can be caused by excessive surging. The potentially damaging effect cannot be precisely measured but is a function of the number, magnitude and duration of the surge cycles. Control actions that take place in the present invention are based on these three parameters.

Normally surge is prevented by an anti-surge control device 22 which regulates a valve 23 to recycle part or all of the gas back to the compressor inlet, or vent it to atmosphere as would be done for an air compressor. However, anti-surge controls and related system components are subject to malfunctions which, in turn, can result in serious compressor damage if too many surge cycles occur. Thus redundancy for the anti-surge control device 22 is needed to protect the machine from short-term damage due to sustained surging and to provide a warning when maintenance is needed to prevent serious damage due to the cumulative effects of occasional surges over a relatively long period of time.

One of the effects of surging is that during any surge cycle the gas temperature in the gas inlet 16 of compressor 12 increases extremely rapidly. However the temperature also varies through a wide range from start-up through extended use of the compressor. Thus there has to be a distinction made between a rapid temperature change and a gradual temperature change taking place in the gas inlet 16 during operation of compressor 12. First and second thermocouples 24 and 26, respectively, are mounted in the gas inlet 16 of compressor 12 where both are subjected to the same temperature. However, one of the thermocouples 26 is of special design and responds very quickly to any temperature change. The other thermocouple 24 is of a standard design and has a relatively slow response to temperature change as compared to the first thermocouple 26. The reason that thermocouple 24 reacts more slowly to a temperature change is because it is encased in a thermowell 29 as shown in FIG. 2 which prevents the heat from reaching the thermocouple element itself quickly. Thus thermocouple 24 is a slow response (Ts) thermocouple while thermocouple 26 is a fast response (Tf) thermocouple. For example, the time constant of the fast thermocouple 26 may be equal to or less than 0.3 second while the time constant of the slow thermocouple 24 may be greater than one minute. The fast thermocouple 26 is made of chromel constantan, type E, 30 gauge wire as manufactured by Omega Engineering Inc. While the slow thermocouple 24 is made of the same type wire except it is 18 gauge. The thermowell 29 is a tapered shank, ¼ inch nominal bore sleeve made of 304 stainless steel manufactured by Ashcroft. These thermocouples 26 and 28 are coupled in opposing electrical relationship as shown in FIG. 2 thereby producing a differential signal level output for a given change in compressor inlet temperature. Since these thermocouples are mounted in the compressor inlet 16 such that both thermocouples 26 and 28 are subject to the same or common temperature change, and since one of the thermocouples responds to that temperature change faster than the other, a differential electrical signal (delta-t) is produced by the thermocouples when a surge occurs because of the rapid temperature rise in the inlet nozzle 16 of compressor 12.

TABLE I

| Temperature °F. | | | Millivolts Gen. | | | Event |
|---|---|---|---|---|---|---|
| Tf | Ts | T | Tf | Ts | Tf − Ts | Represented |
| 0° F. | 50° F. | −50° F. | −1.2 | 0.6 | −1.8 | Broken thermocouple |
| 100° F. | 50° F. | 50° F. | 2.4 | 0.6 | 1.8 | Mild Surge |
| 250° F. | 50° F. | 200° F. | 7.8 | 0.6 | 7.2 | Medium Surge |
| 450° F. | 50° F. | 400° F. | 15.9 | 0.6 | 15.3 | Major Surge |

Table I illustrates the relationship of the temperature detected by the fast responding (Tf) thermocouple 26, the temperature detected by the slow responding (Ts) thermocouple 24, the delta-t, (Tf−Ts), for a given operating ambient temperature of 50° F., and the millivolt signal generated by each of the thermocouple circuits and, since the thermocouples are electrically connected in opposition to each other, the algebraically summed output millivolts (Tf−Ts), and the event represented by each of these conditions. It should be noted that the values given in Table I are with the slow thermocouple (Ts) at the ambient temperature of 50° F. Due to thermocouple nonlinearity, actual delta-t values will vary approximately plus or minus five degrees over the average range of ambient operating temperatures.

The first event represented in Table I is a broken thermocouple. This condition could also occur momentarily during a cold weather start-up of a warm compressor. Prior to start-up, the delta-t indication would be approximately zero since both the fast thermocouple 26 and the slow thermocouple 24 would be at the same temperature of 50° F. The delta-t would then drop rapidly as the compressor begins taking in cold outside air or gas. This could cause, for instance, a delta-t of −50 degrees. This same electrical indication would exist if either thermocouple breaks because the instrument is designed to drive down scale if the thermocouple input circuit is disconnected.

If the temperature in the gas inlet 16 suddenly surged to 100° F. the delta-t would be 50° F. and the difference in the millivolts generated by the fast responding thermocouple 26 as compared to the slow responding thermocouple 24 would be 1.8 millivolts and that signal would represent a mild surge.

Should the temperature in the intake manifold or inlet 16 to compressor 12 suddenly surge to 250° F., the delta-t would be 200° F. and the difference in the millivolts generated by the fast thermocouple 26 and the slow thermocouple 24 would be 7.2 millivolts which would represent a medium surge.

If the temperature in the intake manifold or inlet 16 of compressor 12 should rapidly increase to 450° F., the delta-t would be 400° F. and the difference in millivolts generated by the fast thermocouple 26 and the slow responding thermocouple 24 would be 15.3 millivolts which would represent a major surge taking place in the compressor.

These millivolt signal levels generated by the slow responding thermocouple 24 and fast responding thermocouple 26 are coupled on lines 28 and 30, respectively, to a differential temperature detector 32. This unit is a millivolt-to-current converter which receives the millivolt input from the thermocouples 24 and 26 and produces a substantially linear current output as illustrated in FIG. 3. It comprises a unit designated as the TC2000A -54 which is manufactured by Dynalco Corporation and which has two set points or signal levels that are adjustable in conjunction with a companion unit designated as TR2249 which is also manufactured by Dynalco and which has two adjustable set points thus giving a total of four adjustable level outputs. As can be seen in the graph in FIG. 3, if the voltage difference in the signals received on lines 28 and 30 from thermocouples 24 and 26 as shown in FIG. 1 represent a temperature difference of −50° as illustrated in Table I, a 4 milliamp output signal is produced by surge detector 32. In like manner, if a difference temperature of +50° is indicated by the millivolt signals on lines 28 and 30 from thermocouples 24 and 26, surge detector 32 produces a 7.2 milliamp output signal. Also, if the difference in temperature is 200° F., as indicated by the millivolt output signal from thermocouples 24 and 26, the output of surge detector 32 is 12 milliamps. Finally, if the temperature difference represented by the millivolt signals on lines 28 and 30 is 400°, the surge detector 32 produces an output signal of 19.2 milliamps.

Thus differential surge detector 32 will produce an analog signal on line 34 covering the range of 4–20 ma. which may be used for producing a chart or to otherwise make a permanent record of the differential temperatures occuring in the inlet manifold 16 of compressor 12.

The signal output on line 36 may represent a major, medium or minor surge. This occurs for a minor surge by having a 7.2 milliamp signal threshold level set in detector 32 by a comparator and when the input signal from thermocouples 24 and 26 causes a signal to be produced by detector 32 that equals or exceeds that comparator threshold level, an output signal is produced on line 36 representing a minor surge. In like manner, if a second signal threshold level is set, as for instance at 12.0 milliamps by a comparator, an output would be produced on line 38 when a major or medium surge occurs in compressor 12. Also, if a third signal threshold level were set at 19.2 milliamps, an output signal would be produced on line 40 when a major surge occurs in compressor 12. Finally, if a fourth signal threshold level is set at 4 milliamps or less, a signal would be produced on line 42 indicating a broken or open thermocouple circuit. In such case the output of the surge detector 32 is driven downwards to 4 ma. Each of the signals on lines 34, 36, 38, 40 and 42 can be used in whatever manner desired to indicate and control surge conditions and to insure proper maintenance of the compressor 12 that is being subjected to the surges.

The two thermocouples are wired with opposing polarity and therefore the rapid temperature rise appears momentarily as a differential temperature (Tf−Ts) signal. A differential temperature detector 32 produces analog and other output signals which are used for visual indication, surge control and compressor shut down.

While the invention has been described in connection with a preferred embodiment, it is not intended to limit the scope of the invention to the particular form set forth but, on the contrary, it is intended to cover such alternatives, modifications, and equivalents as may be included within the spirit and scope of the invention as defined by the appended claims.

I claim:

1. A surge detector for a rotating compressor having a compressor stage with a gas inlet and a gas outlet and experiencing rapid changes in inlet temperature as said surges occur, said detector comprising:

a. means mounted in said compressor inlet for generating electrical signals representing only those temperature changes therein which are due to surge conditions, and b. means coupled to said generating means for receiving electrical said signals representing said temperature changes and producing control signals based upon said temperature changes in said inlet to detect the number, duration and magnitude of said surges.

2. A surge detector as in claim 1 wherein said signal generating means comprises:
 a. a first thermocouple having a rapid response to temperature change and producing an output signal, Tf, and
 b. a second thermocouple having a slow response to temperature change in comparison with said first thermocouple response and having its output, Ts, algebraically summed with said first thermocouple's output whereby said combined outputs represent a surge created change in temperature occurring between said two thermocouples.

3. A surge detector as in claim 2 wherein said thermocouples are coupled in opposing electrical relationship thereby producing a differential signal level output for a given change in temperature that represents Tf−Ts.

4. A surge detector as in claim 3 further comprising:
 a. means coupled to said thermocouple outputs for converting said differential output to signals representing a particular temperature change and wherein said signals comprise:
 b. a first output of 4 milliamps represents a temperature change of −50° F. thereby representing a broken thermocouple lead,
 c. a second discrete output of 7.2 milliamps represents a temperature change of 50° F. thereby indicating a mild surge;
 d. a third discrete output of 12 milliamps represents a temperature change of 200° F. thereby indicating a medium surge; and
 e. a fourth discrete output of 19.2 milliamps represents a temperature change of 400° F. thereby indicating a major surge.

5. A surge detector for a turbo compressor having a compressor stage with a gas inlet and a gas outlet, said detector comprising:
 a. a first thermocouple having a rapid temperature change response, Tf,
 b. a second thermocouple having a slow temperature change response, Ts, when compared to said first thermocouple response,
 c. means mounting said first and second thermocouples in said compressor in that such that both thermocouples are subject to the same temperature, and
 d. means for electrically coupling said first and second thermocouples such that at any constant ambient temperature said thermocouples produce equal but opposite voltages and with any rapid temperature change, a differential signal, Tf−Ts, is produced in proportion to said temperature change whereby said differential signal may be used to detect the number, duration and magnitude of said surges.

6. An improved surge detector as in claim 5 further including:
 a. control signal generating means coupled to said thermocouples to receive said differential electrical signal, Tf−Ts and,
 b. means in said control signal generating means for establishing a first signal threshold level representing a broken thermocouple lead, a second signal threshold level representing a mild surge, a third signal threshold level representing a medium surge, and a fourth signal threshold level representing a major surge and comparing said established signal levels with said received signal levels and producing an output control signals representing a broken thermocouple lead, a minor surge, a medium surge and a major surge whenever said received signal level equals or exceeds the corresponding one of said established signal levels.

7. In a turbo compressor surge detection system for use with a compressor having a gas inlet and a gas outlet and having means for detecting a surge in said compressor and means coupled to said detection means for controlling said surge, and improved surge detecting means comprising:
 a. first and second thermocouples having different rates of response to temperature change, Tf, and Ts, respectively,
 b. means for mounting said first and second thermocouples in said compressor inlet such that both thermocouples are subject to the same temperature, and
 c. means for electrically coupling said first and second thermocouples such that at any constant ambient temperature said thermocouples produce equal but opposite electrical signals and with any rapid temperature change, a differential electrical signal, Tf−Ts, is produced in proportion to said temperature change whereby said differential electrical signal may be used to control said surges and to detect the number, duration and magnitude of said surges.

8. A method of detecting surges in a turbo compressor which has a gas inlet and a gas outlet and which experiences a rapid temperature change in said inlet gas temperature during a surge, said method comprising the steps of:
 a. detecting only those temperature changes in said compressor inlet which are due to surge conditions, and
 b. generating control signals based upon said temperature changes to detect the number, duration and magnitude of said surges thereby enabling proper maintenance of said turbo compressor.

9. The method of claim 8 further including the steps of:
 a. locating first and second thermocouples with different temperature response times, Tf and Ts, in said compressor inlet such that both thermocouples are subject to the same temperatures, and
 b. electrically coupling said thermocouples such that at any constant ambient temperature said thermocouples produce equal but opposite voltages and with any rapid temperature rise a differential electrical signal is developed between said two thermocouples enabling the number, duration and magnitude of said surges to be detected.

10. A method as in claim 9 further including the step of coupling said thermocouples in opposing electrical relationship thereby producing a differential signal level output, Tf−Ts, for a given change in temperature.

11. A method as in claim 10 further including the step of:

a. converting said thermocouple differential output signals to represent a particular temperature change, said conversion to represent a particular temperature change comprising the steps of:
  i. generating a first output signal to represent a temperature change of −50° F. thereby indicating a broken thermocouple lead,
  ii. generating a second output signal to represent a temperature change of 50° F. thereby indicating a mild surge,
  iii. generating a third output signal to represent a temperature change of 200° F. thereby indicating a medium surge, and
  iv. generating a fourth output signal to represent a temperature change of 400° F. thereby indicating a major surge.

12. A method of detecting surges in a turbo compressor having a compressor stage with a gas inlet and a gas outlet, said method comprising the steps of:
  a. mounting first and second thermocouples in said compressor inlet such that both thermocouples are subject to the same temperature, said first and second thermocouples having different rates of response, Tf and Ts, respectively, to temperature change, and
  b. electrically coupling said first and second thermocouples such that at any constant ambient temperature said thermocouples produce equal but opposite electrical signals and with any rapid temperature change, a differential electrical signal, Tf−Ts, is produced in proportion to said temperature change whereby said differential electrical signal may be used to control said surges and to detect the number, duration and magnitude of said surges.

13. A method as in claim 12 further comprising the steps of:
  a. coupling control signal generating means to said thermocouple to receive said differential electrical signal,
  b. establishing in said control signal generating means a first electrical signal level representing a broken thermocouple lead, a second signal level representing a mild surge, a third signal level representing a medium surge, and a fourth signal level representing a major surge, and
  c. comparing said established signal levels with said received signal levels and producing an output control signal representing a broken thermocouple lead, a minor surge, a medium surge, and a major surge whenever said received signal level equals or exceeds the corresponding one of said established signal levels.

* * * * *